United States Patent
Chin et al.

(10) Patent No.: US 10,241,264 B2
(45) Date of Patent: Mar. 26, 2019

(54) SEMICONDUCTOR DEVICE PACKAGES

(71) Applicant: Advanced Semiconductor Engineering, Inc., Kaohsiung (TW)

(72) Inventors: Yi-Min Chin, Kaohsiung (TW); Yung-Shun Chang, Kaohsiung (TW); Mei-Ju Lu, Kaohsiung (TW); Jia-Hao Zhang, Kaohsiung (TW); Wen-Chi Hung, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 15/201,095

(22) Filed: Jul. 1, 2016

(65) Prior Publication Data

US 2018/0003894 A1    Jan. 4, 2018

(51) Int. Cl.
*G02B 6/36* (2006.01)
*G02B 6/12* (2006.01)

(52) U.S. Cl.
CPC ..... *G02B 6/12004* (2013.01); *G02B 6/12002* (2013.01); *G02B 2006/12123* (2013.01); *G02B 2006/12147* (2013.01)

(58) Field of Classification Search
None
See application file for complete search history.

(56) References Cited

U.S. PATENT DOCUMENTS

| | | |
|---|---|---|
| 5,598,495 A | 1/1997 | Rittle et al. |
| 6,088,153 A | 7/2000 | Anthon et al. |
| 6,229,158 B1 | 5/2001 | Minemier et al. |
| 6,229,712 B1 | 5/2001 | Munoz-Bustamante et al. |
| 6,253,005 B1 | 6/2001 | Bergmann et al. |
| 6,275,625 B1 | 8/2001 | Bergmann |
| 6,325,552 B1 | 12/2001 | Brillhart |
| 6,351,329 B1 | 2/2002 | Greywall |
| 6,363,203 B1 | 3/2002 | Dautartas |
| 6,370,311 B1 | 4/2002 | Basavanhally |
| 6,374,012 B1 | 4/2002 | Bergmann et al. |
| 6,388,798 B2 | 5/2002 | Smith et al. |
| 6,396,711 B1 | 5/2002 | Degani et al. |
| 6,399,418 B1 | 6/2002 | Glenn et al. |
| 6,404,533 B1 | 6/2002 | Fergusson |
| 6,408,120 B1 | 6/2002 | Dautartas |
| 6,411,757 B1 | 6/2002 | Brener et al. |
| 6,420,204 B2 | 7/2002 | Glenn |
| 6,431,765 B1 | 8/2002 | Chen et al. |
| 6,439,895 B1 | 8/2002 | Li |
| 6,442,306 B1 | 8/2002 | Dautartas et al. |
| 6,442,307 B1 | 8/2002 | Carr et al. |
| 6,448,506 B1 | 9/2002 | Glenn et al. |
| 6,477,301 B1 | 11/2002 | Anthon et al. |
| 6,487,001 B2 | 11/2002 | Greywall |
| 6,487,356 B1 | 11/2002 | Harrison et al. |
| 6,512,861 B2 | 1/2003 | Chakravorty et al. |

(Continued)

*Primary Examiner* — Eric Wong
(74) *Attorney, Agent, or Firm* — Foley & Lardner LLP; Cliff Z. Liu

(57) ABSTRACT

A semiconductor device package includes a substrate and an optical device. The optical device includes a first portion extending into the substrate and not extending beyond a first surface of the substrate. The optical device further includes a second portion extending along the first surface of the substrate.

19 Claims, 4 Drawing Sheets

(56) References Cited

U.S. PATENT DOCUMENTS

| | | |
|---|---|---|
| 6,519,075 B2 | 2/2003 | Carr et al. |
| 6,628,452 B2 | 3/2003 | Haeberle et al. |
| 6,560,377 B2 | 5/2003 | Jones et al. |
| 6,564,454 B1 | 5/2003 | Glenn et al. |
| 6,576,998 B1 | 6/2003 | Hoffman |
| 6,586,824 B1 | 7/2003 | Glenn et al. |
| 6,603,183 B1 | 8/2003 | Hoffman |
| 6,618,184 B2 | 9/2003 | Jin et al. |
| 6,624,444 B1 | 9/2003 | Li |
| 6,630,661 B1 | 10/2003 | Hoffman |
| 6,639,724 B2 | 10/2003 | Bower et al. |
| 6,646,290 B1 | 11/2003 | Lee et al. |
| 6,661,943 B2 | 12/2003 | Li |
| 6,686,588 B1 | 2/2004 | Webster et al. |
| 6,702,476 B2 | 3/2004 | Bergmann et al. |
| 6,704,475 B2 | 3/2004 | Jin et al. |
| 6,704,476 B2 | 3/2004 | Ford et al. |
| 6,712,527 B1 | 3/2004 | Chan et al. |
| 6,716,657 B1 | 4/2004 | Soh |
| 6,718,086 B1 | 4/2004 | Ford et al. |
| 6,740,950 B2 | 5/2004 | Paek |
| 6,748,125 B2 | 6/2004 | Deliwala |
| 6,754,407 B2 | 6/2004 | Chakravorty et al. |
| 6,757,458 B2 | 6/2004 | Neilson et al. |
| 6,759,266 B1 | 7/2004 | Hoffman |
| 6,765,801 B1 | 7/2004 | Glenn et al. |
| 6,771,850 B1 | 8/2004 | Greywall |
| 6,784,534 B1 | 8/2004 | Glenn et al. |
| 6,788,847 B2 | 9/2004 | Paddon et al. |
| 6,793,407 B2 | 9/2004 | Jacobowitz et al. |
| 6,801,676 B1 | 10/2004 | Liu |
| 6,807,218 B1 | 10/2004 | Greenwood et al. |
| 6,809,258 B1 | 10/2004 | Dang et al. |
| 6,809,848 B2 | 10/2004 | Carr et al. |
| 6,813,054 B2 | 11/2004 | Aksyuk et al. |
| 6,819,813 B2 | 11/2004 | Howland et al. |
| 6,839,517 B2 | 1/2005 | Anigbo et al. |
| 6,841,842 B2 | 1/2005 | Li |
| 6,846,087 B2 | 1/2005 | Carr et al. |
| 6,856,730 B2 | 2/2005 | Johnson et al. |
| 6,859,324 B2 | 2/2005 | Meyers et al. |
| 6,861,720 B1 | 3/2005 | Heckman et al. |
| 6,869,815 B2 | 3/2005 | Gasparyan et al. |
| 6,879,751 B2 | 4/2005 | Deliwala |
| 6,864,553 B2 | 5/2005 | Bennett et al. |
| 6,891,685 B2 | 5/2005 | Deliwala et al. |
| 6,896,422 B2 | 5/2005 | Bennett et al. |
| 6,906,846 B2 | 6/2005 | Cirelli et al. |
| 6,912,330 B2 | 6/2005 | Deliwala |
| 6,922,499 B2 | 7/2005 | Boie et al. |
| 6,944,008 B2 | 9/2005 | Arney et al. |
| 6,944,369 B2 | 9/2005 | Deliwala |
| 6,955,481 B2 | 10/2005 | Colgan et al. |
| 6,968,110 B2 | 11/2005 | Patel et al. |
| 6,973,230 B1 | 12/2005 | Mackay |
| 6,975,664 B1 | 12/2005 | Dodabalapur et al. |
| 6,975,784 B1 | 12/2005 | Xu et al. |
| 7,000,434 B2 | 2/2006 | Murali |
| 7,003,196 B2 | 2/2006 | Ghiron et al. |
| 7,013,067 B2 | 3/2006 | Ghiron et al. |
| 7,015,056 B2 | 3/2006 | Gasparyan et al. |
| 7,020,364 B2 | 3/2006 | Ghiron et al. |
| 7,026,707 B2 | 4/2006 | Li et al. |
| 7,031,562 B2 | 4/2006 | Paddon et al. |
| 7,039,263 B2 | 5/2006 | Towle |
| 7,042,106 B2 | 5/2006 | Lu et al. |
| 7,049,704 B2 | 5/2006 | Chakravorty et al. |
| 7,054,534 B1 | 5/2006 | Gunn, III et al. |
| 7,058,247 B2 | 6/2006 | Crow et al. |
| 7,059,040 B1 | 6/2006 | Webster et al. |
| 7,068,892 B1 | 6/2006 | Lu et al. |
| 7,081,981 B2 | 7/2006 | Ling et al. |
| 7,082,246 B1 | 7/2006 | Gunn, III et al. |
| 7,095,620 B2 | 8/2006 | Bozso et al. |
| 7,095,914 B2 | 8/2006 | Xu et al. |
| 7,116,881 B1 | 10/2006 | Gunn, III et al. |
| 7,146,106 B2 | 12/2006 | Yang et al. |
| 7,159,421 B2 | 1/2007 | Bhandarkar et al. |
| 7,177,499 B2 | 2/2007 | Johnson |
| 7,187,837 B2 | 3/2007 | Gothoskar et al. |
| 7,212,713 B2 | 5/2007 | Fukuzawa et al. |
| 7,224,076 B2 | 5/2007 | Agrawal et al. |
| 7,229,221 B2 | 6/2007 | Ahrens |
| 7,245,803 B2 | 7/2007 | Gunn, III et al. |
| 7,256,059 B2 | 8/2007 | Lu et al. |
| 7,260,289 B1 | 8/2007 | Gunn et al. |
| 7,260,293 B1 | 8/2007 | Gunn et al. |
| 7,269,326 B2 | 9/2007 | Paddon et al. |
| 7,283,699 B2 | 10/2007 | Lu et al. |
| 7,298,939 B1 | 11/2007 | Malendevich et al. |
| 7,333,695 B2 | 2/2008 | Xu et al. |
| 7,334,946 B2 | 2/2008 | Lu |
| 7,343,058 B2 | 3/2008 | Block et al. |
| 7,352,066 B2 | 4/2008 | Budd et al. |
| 7,359,591 B2 | 4/2008 | Vandentop et al. |
| 7,359,609 B2 | 4/2008 | Mahoney et al. |
| 7,367,715 B1 | 5/2008 | Budd et al. |
| 7,369,718 B2 | 5/2008 | Towel |
| 7,373,033 B2 | 5/2008 | Lu et al. |
| 7,373,044 B2 | 5/2008 | Sekiya et al. |
| 7,409,327 B2 | 8/2008 | Deliwala |
| 7,412,138 B1 | 8/2008 | Malendevich et al. |
| 7,415,184 B2 | 8/2008 | Ghiron et al. |
| 7,433,193 B2 | 10/2008 | Yee et al. |
| 7,470,069 B1 | 12/2008 | Offrein et al. |
| 7,477,811 B1 | 1/2009 | Dellmann et al. |
| 7,480,426 B1 | 1/2009 | Dellmann et al. |
| 7,486,847 B1 | 2/2009 | Dellmann et al. |
| 7,539,366 B1 | 5/2009 | Baks et al. |
| 7,539,376 B2 | 5/2009 | Bozso et al. |
| 7,551,453 B2 | 6/2009 | Bozso et al. |
| 7,556,440 B2 | 7/2009 | Birincioglu et al. |
| 7,576,401 B1 | 8/2009 | De Guzman et al. |
| 7,609,461 B1 | 10/2009 | Webster et al. |
| 7,630,601 B2 | 12/2009 | Mershon et al. |
| 7,676,132 B1 | 3/2010 | Mandry et al. |
| 7,684,660 B2 | 3/2010 | Braunisch et al. |
| 7,701,985 B2 | 4/2010 | Webster et al. |
| 7,731,432 B2 | 6/2010 | Theodoras, II |
| 7,773,836 B2 | 8/2010 | De Dobbelaere |
| 7,801,397 B2 | 9/2010 | Block et al. |
| 7,826,692 B2 | 11/2010 | Mongold |
| 7,826,694 B2 | 11/2010 | Vandentop et al. |
| 7,853,105 B2 | 12/2010 | Budd et al. |
| 7,903,911 B2 | 3/2011 | Sekiya et al. |
| 7,911,017 B1 | 3/2011 | De Guzman et al. |
| 7,936,033 B2 | 5/2011 | Haskett et al. |
| 7,941,023 B2 | 5/2011 | Patel et al. |
| 7,945,127 B2 | 5/2011 | Lu |
| 7,961,992 B2 | 6/2011 | De Dobbelaere et al. |
| 8,057,108 B2 | 11/2011 | Bhowmik et al. |
| 8,165,431 B2 | 4/2012 | De Dobbelaere et al. |
| 8,200,056 B2 | 6/2012 | Baugh |
| 8,231,284 B2 | 7/2012 | Doany et al. |
| 8,265,432 B2 | 9/2012 | Doany et al. |
| 8,280,207 B2 | 10/2012 | Pinguet et al. |
| 8,373,259 B2 | 2/2013 | Kim et al. |
| 8,445,984 B2 | 5/2013 | Haskett et al. |
| 8,488,921 B2 | 7/2013 | Doany et al. |
| 8,545,108 B1 | 10/2013 | Barwicz et al. |
| 8,577,191 B2 | 11/2013 | De Dobbelaere et al. |
| 8,588,561 B2 | 11/2013 | Zbinden et al. |
| 8,613,561 B2 | 12/2013 | Ko et al. |
| 8,724,937 B2 | 5/2014 | Barwicz et al. |
| 8,731,346 B2 | 5/2014 | Tseng et al. |
| 8,750,657 B2 | 6/2014 | Levy et al. |
| 8,755,644 B2 | 6/2014 | Budd et al. |
| 8,787,711 B2 | 7/2014 | Zbinden et al. |
| RE45,215 E | 10/2014 | De Dobbelaere et al. |
| 8,871,570 B2 | 10/2014 | Levy et al. |
| 8,873,899 B2 | 10/2014 | Anderson et al. |
| 8,873,912 B2 | 10/2014 | Dangel et al. |
| 8,876,410 B2 | 11/2014 | Shastri et al. |
| 8,905,632 B2 | 12/2014 | Shastri et al. |

(56) References Cited

U.S. PATENT DOCUMENTS

| | | |
|---|---|---|
| 8,913,856 B2 | 12/2014 | Jacobowitz et al. |
| 8,923,664 B2 | 12/2014 | Mekis et al. |
| 8,926,196 B2 | 1/2015 | Detofsky et al. |
| RE45,390 E | 2/2015 | De Dobbelaere et al. |
| 8,944,704 B2 | 2/2015 | Lagziel et al. |
| 2004/0156590 A1 | 8/2004 | Gunn et al. |
| 2006/0140553 A1 | 6/2006 | Theodoras et al. |
| 2010/0008675 A1 | 1/2010 | De Dobbelaere |
| 2011/0127633 A1 | 6/2011 | Nadeau et al. |
| 2011/0216997 A1 | 9/2011 | Gothoskar et al. |
| 2011/0229092 A1* | 9/2011 | Fujiwara ............... G02B 6/3831 385/88 |
| 2011/0317958 A1 | 12/2011 | Nadeau et al. |
| 2012/0280344 A1 | 11/2012 | Shastri et al. |
| 2013/0004167 A1* | 1/2013 | Kim .................... G02B 6/4214 398/43 |
| 2013/0202255 A1 | 8/2013 | Togami et al. |
| 2013/0243368 A1 | 9/2013 | Levy et al. |
| 2013/0315528 A1 | 11/2013 | Levy |
| 2014/0284463 A1 | 9/2014 | Kuroda et al. |
| 2014/0286646 A1 | 9/2014 | Zbinden et al. |
| 2014/0369651 A1 | 12/2014 | Ben David et al. |
| 2014/0369693 A1 | 12/2014 | Peterson et al. |
| 2015/0010268 A1 | 1/2015 | Badihi et al. |
| 2015/0016784 A1 | 1/2015 | Shastri et al. |
| 2015/0021291 A1 | 1/2015 | Shastri et al. |
| 2015/0037029 A1 | 2/2015 | Waldman et al. |
| 2015/0338586 A1* | 11/2015 | Sunaga ................ G02B 6/4292 385/33 |
| 2017/0205592 A1* | 7/2017 | Pfnuer ................ G02B 6/4243 |

* cited by examiner

SEMICONDUCTOR DEVICE PACKAGES

BACKGROUND

1. Technical Field

The present disclosure relates to a semiconductor device package. In particular, the present disclosure relates to a semiconductor device package including optical devices.

2. Description of the Related Art

A waveguide can be used to guide light from a light emitter to an optical sensor in a semiconductor device package. The light emitter and the optical sensor may be disposed in a cavity, or each in a separate cavity, formed in the semiconductor device package. Horizontal misalignment may occur during placement of the light emitter and the optical sensor in the cavity or cavities. Further, a depth of the cavity or cavities in the semiconductor device package may not be consistent, such that a depth tolerance of the cavity or cavities may result in vertical misalignment of the light emitter, the waveguide and the optical sensor.

SUMMARY

In an embodiment, a semiconductor device package includes a substrate and an optical device. The optical device includes a first portion extending into the substrate and not extending beyond a first surface of the substrate. The optical device further includes a second portion extending along the first surface of the substrate.

In an embodiment, a semiconductor device package includes a substrate, a waveguide and an optical device. The substrate defines a space having a bottom surface. The waveguide is disposed in the substrate. The optical device is disposed in the space and is separated from the bottom surface of the space by a distance. The optical device includes an alignment portion extending along a first surface of the substrate and supported by the first surface of the substrate, and a light emitting or a light receiving portion aligned with the waveguide.

In an embodiment, a semiconductor device package includes a substrate and an optical device. The optical device includes a first portion extending into the substrate without protruding from a first surface of the substrate, and a second portion extending along the first surface of the substrate. The second portion of the optical device is directly disposed on the first surface of the substrate.

BRIEF DESCRIPTION OF THE DRAWINGS

Common reference numerals are used throughout the drawings and the detailed description to indicate the same or similar elements. Embodiments of the present disclosure will be more apparent from the following detailed description taken in conjunction with the accompanying drawings.

DETAILED DESCRIPTION

Described in the present disclosure are techniques for providing optical devices to improve quality of light transmission. Moreover, the techniques may improve horizontal and vertical alignments such that misalignment between optical components is mitigated.

Spatial descriptions, such as "above," "below," "up," "left," "right," "down," "top," "bottom," "vertical," "horizontal," "side," "higher," "lower," "upper," "over," "under," and so forth are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

Figure 1:
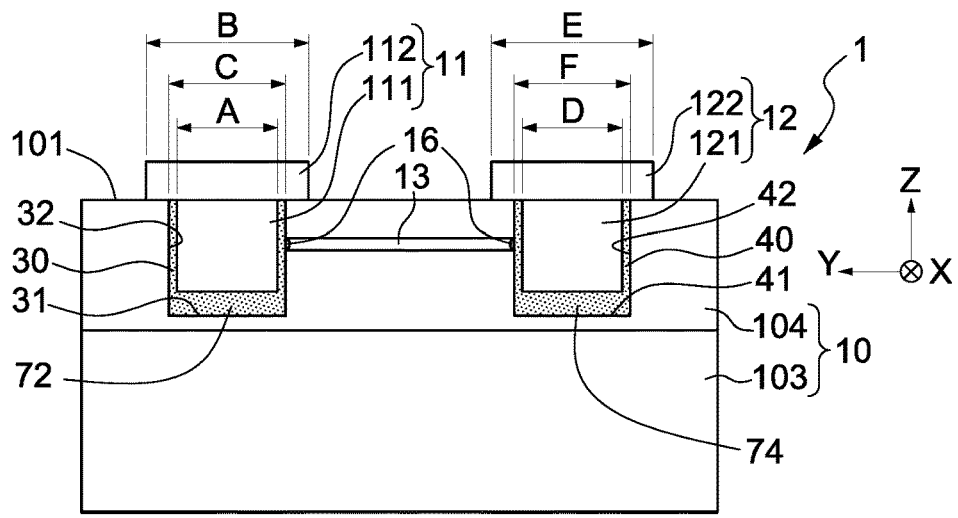
FIG. 1 is a cross-sectional view of a semiconductor device package in accordance with an embodiment of the present disclosure.

FIG. 1 is a cross-sectional view of a semiconductor device package 1 in accordance with an embodiment of the present disclosure. The semiconductor device package 1 includes a substrate 10, optical devices 11 and 12, a waveguide 13 and two lenses 16.

The substrate 10 has a top surface 101. The substrate 10 includes a semiconductor layer 103 and a semiconductor oxide layer 104 on the semiconductor layer 103.

The semiconductor layer 103 may include, for example, silicon or another suitable material. The semiconductor oxide layer 104 may include, for example, silicon oxide ($SiO_x$), or another suitable material.

A space 30 is defined by a bottom 31 and side walls 32 of the semiconductor oxide layer 104. A space 40 is defined by a bottom 41 and side walls 42 of the semiconductor oxide layer 104. The space 30 is separated from the space 40 by the semiconductor oxide layer 104. The space 30 receives or accommodates the optical device 11. An adhesive gel 72 may surround a portion of the optical device 11 in the space 30, and fill the space 30 to approximately the bottom of the waveguide 13 and lens 16. The adhesive gel 72 does not touch the waveguide 13 and lens 16. An adhesive gel 74 may surround a portion of the optical device 12 in the space 40, and fill the space 40 to approximately the bottom of the waveguide 13 and 16. The adhesive gel 74 does not touch the waveguide 13 and lens 16.

The waveguide 13 is disposed within the semiconductor oxide layer 104. A material of the waveguide 13 may be, or may include, a fiber, a polymer, a glass or another suitable material. Light from the optical device 11 may be transmitted to the optical device 12 by the waveguide 13, and vice versa. The waveguide 13 may be formed in the substrate 10 before disposing the optical device 11 and the optical device 12 in the respective space 30 and space 40. The waveguide 13 may be formed during a process of manufacturing the substrate 10. The waveguide 13 includes a lens 16 at each end for light convergence.

The optical device 11 includes a light emitter (e.g., a light emitting diode or a laser diode). The optical device 11 may be a light emitting die. The optical device 11 includes a first portion 111 and a second portion 112. The first portion 111 and the second portion 112 may be two portions of a single component, formed integrally (e.g., in a same process stage using a same material). The first portion 111 and the second portion 112 may be two separate members which are attached together to form the optical device 11.

The first portion 111 is positioned to extend into the space 30 of the substrate 10, and to not extend above the top surface 101 of the substrate 10. The optical device 11 is positioned such that the second portion 112 is laterally protruded from the first portion 111 external to the substrate 10 and extends along the top surface 101 of the substrate 10. The second portion 112 of the optical device 11 is supported by the top surface 101 of the substrate 10 such that the first portion 111 of the optical device 11 remains at a distance from the bottom 31 of the space 30. The second portion 112 of the optical device 11 serves as an alignment portion of the optical device 11.

The first portion 111 has a dimension A (e.g., width), the second portion 112 has a dimension B (e.g., width), and the space 30 has a dimension C (e.g., width). The dimension B is greater than the dimension A and the dimension C (in other words, B>A and B>C). In some embodiments, the dimension B is greater than the dimension C plus a difference between the dimension C and the dimension A (in other words, B>C+(C−A)).

The first portion 111 of the optical device 11 may include a light emitting area (not shown in FIG. 1), which may be aligned with the waveguide 13. The waveguide 13 has a height in a Z direction in an X-Y-Z coordinate system. The waveguide 13 has a width in an X direction of the X-Y-Z coordinate system (where the X axis extends perpendicularly to the Y-Z plane illustrated). With the structure of the optical device 11 as shown, a tolerance of a vertical alignment (e.g., in the Z direction) of the light emitting area of the first portion 111 with the waveguide 13 may be less than about one third of a vertical dimension (e.g., height) of the waveguide 13 in the Z direction, to prevent optical coupling loss induced by a vertical offset. In addition, a tolerance of a lateral alignment (e.g., in the X direction) of the light emitting area of the first portion 111 with the waveguide 13 may be less than about one third of a lateral dimension (e.g., width) of one end of the waveguide 13 in the X direction, to prevent optical coupling loss induced by a lateral offset.

If the vertical offset between the light emitting area of the first portion 111 and the waveguide 13 in the Z direction is greater than or equal to about one third of the vertical dimension (e.g., height) of the waveguide 13, then light energy received by the waveguide 13 may be less than about 10% of light energy emitted by the light emitting area of the first portion 111 due to an optical coupling loss induced by the vertical offset. Similarly, if the lateral offset between the light emitting area of the first portion 111 and the waveguide 13 in the X direction is greater than or equal to about one third of the lateral dimension (e.g., width) of the waveguide 13, then light energy received by the waveguide 13 may be less than about 10% of light energy emitted by the light emitting area of the first portion 111 due to an optical coupling loss induced by the lateral offset. Use of the optical device 11 with the first portion 111 and the second portion 112 facilitates improved alignment by providing a vertical maneuvering area in the space 30 below the first portion 111, and a lateral maneuvering area within the space 30 around a periphery of the first portion 111. Accordingly, lateral alignment tolerance does not rely on a manufacturing tolerance related to an alignment of the space 30 with the waveguide 13, and vertical alignment tolerance does not rely on a manufacturing tolerance related to a depth of the space 30.

The optical device 12 includes an optical detector. The optical device 12 includes a first portion 121 and a second portion 122. Portions 121 and 122 may be two portions of a single component, formed integrally (e.g., in a same process stage using a same material). Portions 121 and 122 may be two separate members which are attached together to form the optical device 12.

The first portion 121 is positioned to extend into the space 40 of the substrate 10, and to not extend above the top surface 101 of the substrate 10. The optical device 12 is positioned such that the second portion 122 is laterally protruded from the portion 121 external to the substrate 10 and extends across the top surface 101 of the substrate 10. The second portion 122 of the optical device 12 is supported by the top surface 101 of the substrate 10 such that the first portion 121 of the optical device 12 is separated from the bottom 41 of the space 40. The second portion 122 of the optical device 12 serves as an alignment portion of the optical device 12.

The portion 121 has a dimension D (e.g., width), the portion 122 has a dimension E (e.g., width), and the space 40 has a dimension F (e.g., width). The dimension E is greater than the dimension D and the dimension F (in other words, E>D and E>F). In some embodiments, the dimension E is greater than the dimension F plus a difference between the dimension F and the dimension D (in other words, E>F+(F−D)).

The portion 121 of the optical device 12 may include a light receiving area (not shown in FIG. 1), which may be aligned with the waveguide 13. With the structure of the optical device 12 as shown, a tolerance of a vertical alignment (e.g., in the Z direction) of the light receiving area of the portion 121 with the waveguide 13 may be less than about one third of a vertical dimension (e.g., height) of the waveguide 13 in the Z direction, to prevent optical coupling loss induced by a vertical offset. In addition, a tolerance of a lateral alignment (e.g., in the X direction) of the light receiving area of the portion 121 with the waveguide 13 may be less than about one third of a lateral dimension (e.g., width) of one end of the waveguide 13 in the X direction, to prevent optical coupling loss induced by a lateral offset.

If the vertical offset between the light receiving area of the portion 121 and the waveguide 13 in the Z direction is greater than or equal to about one third of the vertical dimension (e.g., height) of the waveguide 13, then light energy received by the light receiving area of the portion 121 may be less than about 10% of light energy emitted by the waveguide 13 due to an optical coupling loss induced by the vertical offset. Similarly, if the lateral offset between the light receiving area of the portion 121 and the waveguide 13 in the X direction is greater than or equal to about one third of the lateral dimension (e.g., width) of the waveguide 13, then light energy received by the light receiving area of the portion 121 may be less than about 10% of light energy emitted by the waveguide 13 due to an optical coupling loss induced by the lateral offset.

Use of the optical device 12 with the first portion 121 and the second portion 122 facilitates improved alignment by providing a vertical maneuvering area in the space 40 below the portion 121, and a lateral maneuvering area within the space 40 around a periphery of the portion 121. Accordingly, lateral alignment tolerance does not rely on a manufacturing tolerance related to an alignment of the space 40 with the waveguide 13, and vertical alignment tolerance does not rely on a manufacturing tolerance related to a depth of the space 40.

In one or more embodiments, a refractive index of the waveguide 13 is larger than a refractive index of the semiconductor oxide layer 104. For example, a refractive index of $SiO_x$ is approximately 1.468, which is less than a refractive index of the waveguide 13. In such an arrangement, transmission loss may be reduced because light transmitted in the waveguide 13 may not enter the semiconductor oxide layer 104.

Figure 2:
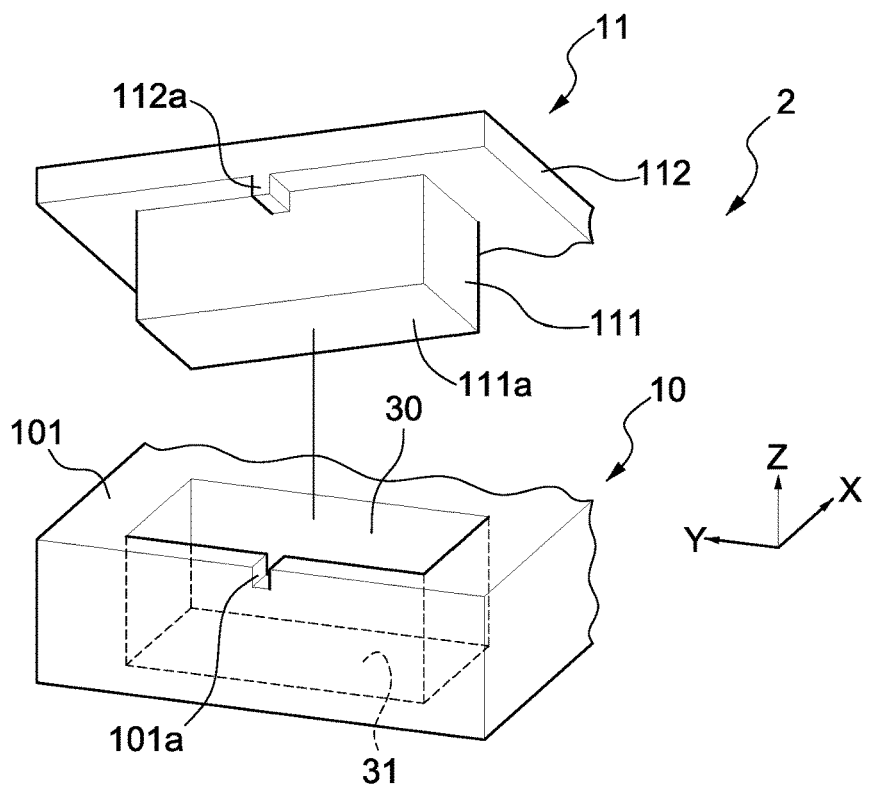
FIG. 2 is a perspective view of a semiconductor device package in accordance with another embodiment of the present disclosure.

FIG. 2 is a perspective view of a semiconductor device package 2 in accordance with an embodiment of the present disclosure. The semiconductor device package 2 illustrates an example of an embodiment of the optical device 11 and the substrate 10 of FIG. 1.

In FIG. 2, the second portion 112 of the optical device 11 includes a protrusion 112a, and the substrate 10 includes a corresponding groove 101a. The protrusion 112a is protruded or extended from the second portion 112 of the optical device 11 in the Z direction, when the optical device 11 is disposed in the substrate 10. The groove 101a extends from the top surface 101 into the substrate 10. The protrusion 112a fits into the groove 101a of the substrate 10. In one or more embodiments, the protrusion 112a may be fittedly engaged (e.g., a snug or tight fit) in the groove 101a of the substrate 10. A design of the protrusion 112a and the groove 101a may facilitate alignment between the optical device 11 and the substrate 10 in the Y direction. Although not shown in FIG. 2, it is contemplated that the optical device 12 may have a similar engagement structure to the optical device 11 of FIG. 2 (e.g., a protrusion similar to the protrusion 112a of the optical device 11 and a groove similar to the groove 101a of the substrate 10).

Figure 3:
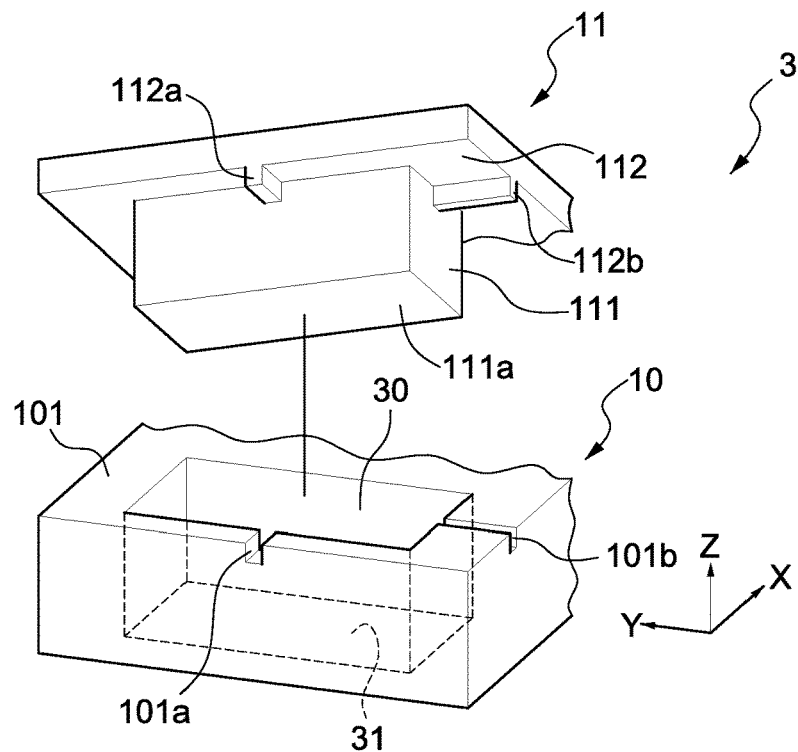
FIG. 3 is a perspective view of a semiconductor device package in accordance with another embodiment of the present disclosure.

FIG. 3 is a perspective view of a semiconductor device package 3 in accordance with an embodiment of the present disclosure. The semiconductor device package 3 illustrates an example of an embodiment of the optical device 11 and the substrate 10 of FIG. 1. A protrusion 112a from the second portion 112 of the optical device 11, and a groove 101a in the substrate 10, are similar to the same-numbered features in FIG. 2, and thus are not described again.

In FIG. 3, a protrusion 112b also extends from the second portion 112, and a groove 101b in the substrate 10 corresponds to the protrusion 112b. The protrusion 112b fits into the groove 101b. In one or more embodiments, the protrusion 112b may be fittedly engaged in the groove 101b of the substrate 10. A design of the protrusion 112b and the groove 101b may facilitate alignment between the optical device 11 and the substrate 10 in the X direction. Although not shown in FIG. 3, it is contemplated that the optical device 12 may have a similar engagement structure to the optical device 11 of FIG. 3 (e.g., protrusions similar to the protrusions 112a/112b of the optical device 11 and grooves similar to the grooves 101a/101b of the substrate 10).

Figure 4:
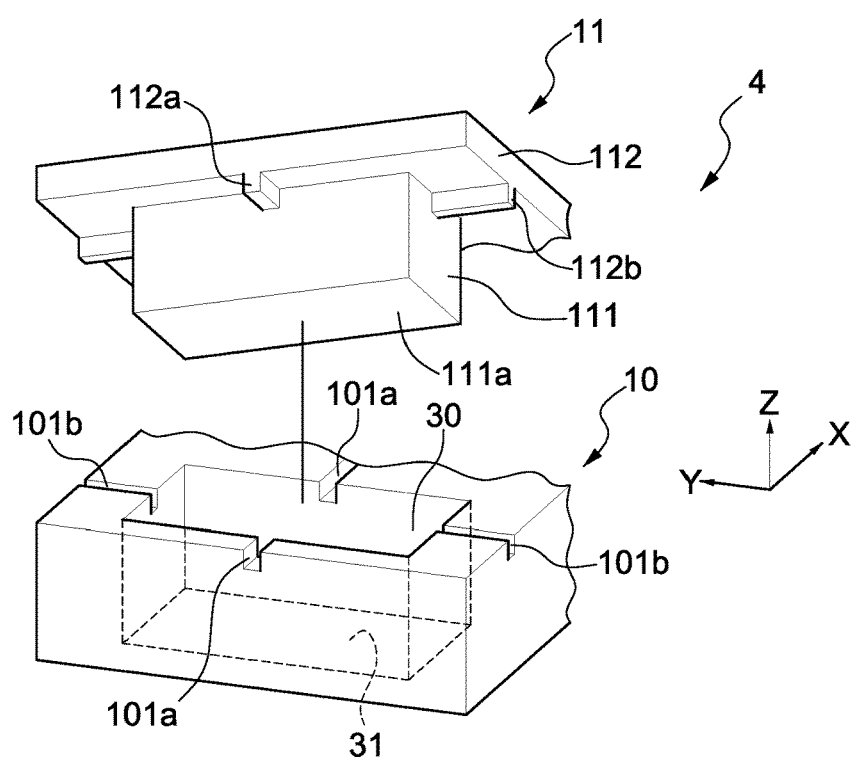
FIG. 4 is a perspective view of a semiconductor device package in accordance with another embodiment of the present disclosure.

FIG. 4 is a perspective view of a semiconductor device package 4 in accordance with an embodiment of the present disclosure. The semiconductor device package 4 illustrates an example of an embodiment of the optical device 11 and the substrate 10 of FIG. 1. Protrusions 112a/112b from the second portion 112 of the optical device 11, and grooves 101a/101b in the substrate 10, are similar to the same-numbered features in FIG. 3, and thus are not described again.

In FIG. 4, the optical device 11 has a protrusion corresponding to the protrusion 112a on an opposite side of the second portion 112 from the protrusion 112a, and further has a protrusion corresponding to the protrusion 112b on an opposite side of the second portion 112 from the protrusion 112b. In other words, there is a protrusion on each of four different sides of the second portion 112. Stated in a different way, the protrusion 112a is one of a pair of protrusions 112a, and the protrusion 112b is one of a pair of protrusions 112b. In like manner, the substrate 10 has four grooves, or a pair of protrusions 101a and a pair of protrusions 101b. The pair of protrusions 112a fit into the pair of grooves 101a, and the pair of protrusions 112b fit into the pair of grooves 101b. A design of the various protrusions and grooves may facilitate alignment between the optical device 11 and the substrate 10 in the X and Y directions. Although not shown in FIG. 4, it is contemplated that the optical device 12 may have a similar engagement structure to the optical device 11 of FIG. 4 (e.g., protrusions similar to the pairs of protrusions 112a/112b of the optical device 11 and grooves similar to the pairs of grooves 101a/101b of the substrate 10).

Figure 5:
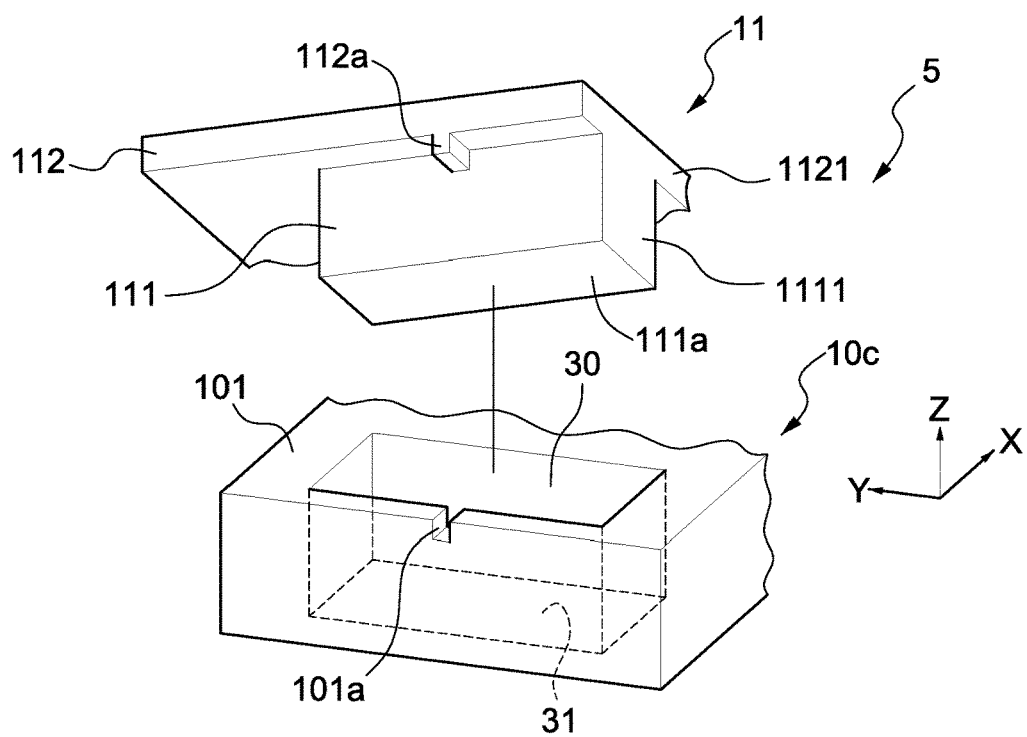
FIG. 5 is a perspective view of a semiconductor device package in accordance with another embodiment of the present disclosure.

FIG. 5 is a perspective view of a semiconductor device package 5 in accordance with an embodiment of the present disclosure. The semiconductor device package 5 is similar to the semiconductor device package 2 illustrated in FIG. 2, except that a surface 1121 of the second portion 112 of the optical device 11 and a surface 1111 of the first portion 111 of the optical device 11 are substantially coplanar. Although not shown in FIG. 5, it is contemplated that the optical device 12 may have a similar structure to the optical device 11 of FIG. 5 (e.g., a surface of the second portion 122 is coplanar with a surface of the first portion 121).

Figure 6:
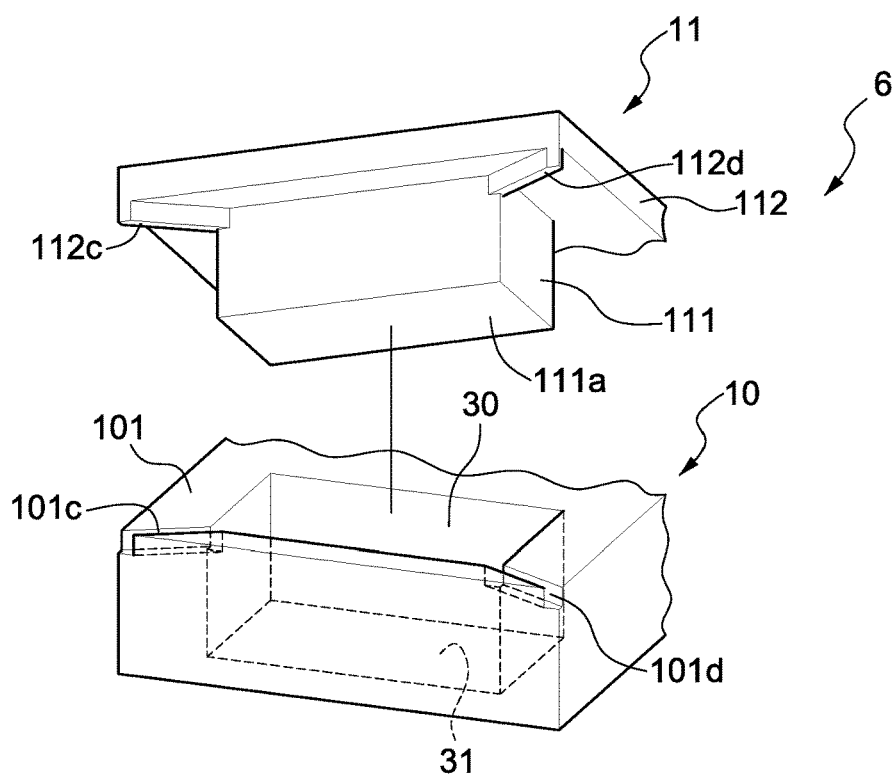
FIG. 6 is a perspective view of a semiconductor device package in accordance with another embodiment of the present disclosure.

FIG. 6 is a perspective view of a semiconductor device package 6 in accordance with an embodiment of the present disclosure. The semiconductor device package 6 illustrates an example of an embodiment of the optical device 11 and the substrate 10 of FIG. 1.

In FIG. 6, the second portion 112 of the optical device 11 includes a protrusion 112c and a protrusion 112d, and the substrate 10 includes corresponding grooves 101c and 101d. The protrusions 112c, 112d are protruded or extended from the second portion 112 of the optical device 11 in an angled manner at adjacent corners of the second portion 112, in the Z direction, when the optical device 11 is disposed in the substrate 10. The grooves 101c and 101d extend from the top surface 101 into the substrate 10. The protrusions 112c and 112d fit respectively into the grooves 101c and 101d. In one or more embodiments, the protrusions 112c and 112d may be fittedly engaged in the respective grooves 101c and 101d. A design of the protrusions 112c and 112d and the grooves 101c and 101d may facilitate alignment between the optical device 11 and the substrate 10 in the X direction and the Y direction. Although not shown in FIG. 6, it is contemplated that the optical device 12 may have a similar engagement structure to the optical device 11 of FIG. 6 (e.g., a protrusion similar to the protrusions 112c and 112d of the optical device 11 and grooves similar to the grooves 101c and 101d of the substrate 10).

Figure 7A:
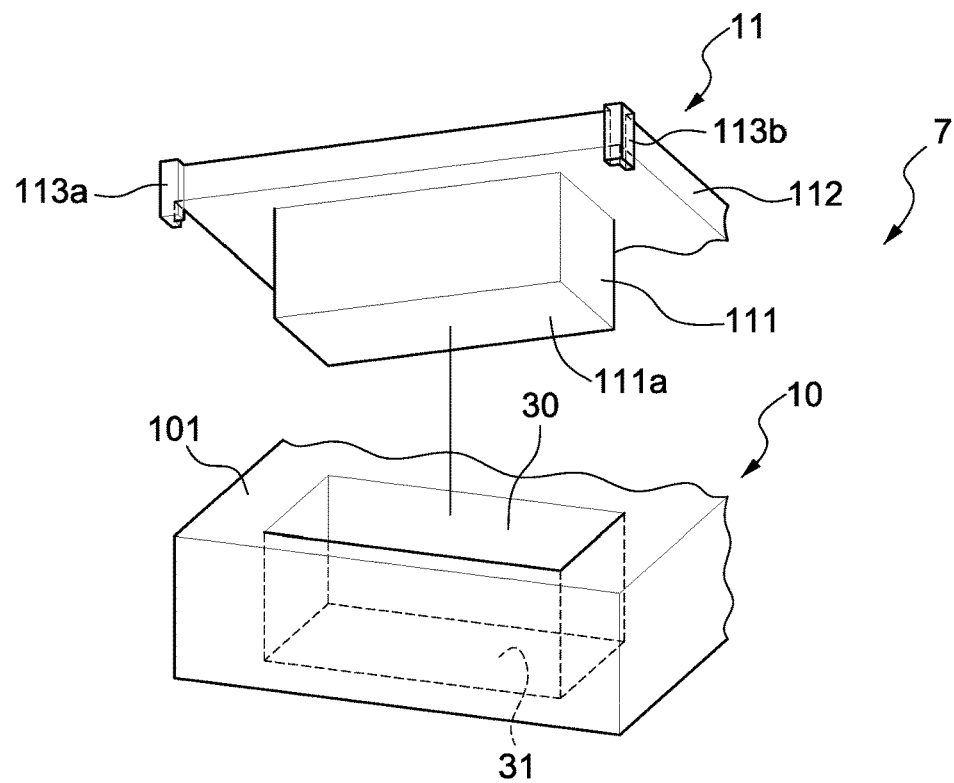
FIG. 7A and FIG. 7B are perspective views of a semiconductor device package in accordance with another embodiment of the present disclosure.

FIG. 7A is a perspective view of a semiconductor device package 7 in accordance with an embodiment of the present disclosure. The semiconductor device package 7 illustrates an example of an embodiment of the optical device 11 and the substrate 10 of FIG. 1.

In FIG. 7A, the second portion 112 of the optical device 11 further includes protrusions 113a and 113b at corners thereof. The two protrusions 113a and 113b are arranged at two adjacent corners of the second portion 112. In one or more embodiments, the two protrusions 113a and 113b may alternatively be arranged in two opposite corners of the second portion 112 of the optical device 11. In one or more embodiments, additional protrusions (in addition to the two protrusions 113a and 113b) are included in additional corners of the second portion 112 of the optical device 11. Each of the protrusions 113a and 113b (and additional protrusions) may engage with the substrate 10, such as with corners of the substrate 10.

Figure 7B:
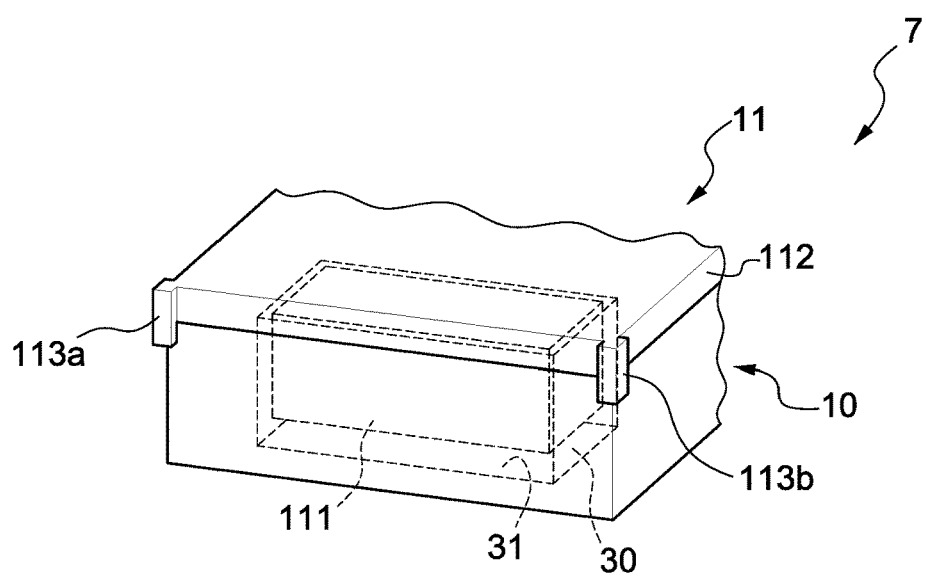

FIG. 7B is a perspective view of an assembly of the semiconductor device package 7 as shown in FIG. 7A. After assembling the semiconductor device package 7, the protrusions 113a and 113b engage the substrate 10, such that corners of the substrate 10 are abutted or confined by the protrusions 113a and 113b. The arrangement of the protrusions 113a and 113b may facilitate an alignment between the optical device 11 and the substrate 10 in the X and/or Y direction.

As used herein, the terms "approximately" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For another example, a first angle may be approximately the same as a second angle if a difference between the first angle and the second angle is less than or equal to ±10°, such as ±5°, ±4°, ±3°, ±2°, ±1°, ±0.5°, ±0.1°, or ±0.05°.

Two surfaces can be deemed to be coplanar or substantially coplanar if a displacement between the two surfaces is no greater than 5 µm, no greater than 2 µm, no greater than 1 µm, or no greater than 0.5 µm.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A semiconductor device package, comprising:
    a substrate having a first surface;
    a waveguide disposed in the substrate; and
    an optical device comprising:
        a first portion extending into the substrate and under the first surface of the substrate, the first portion comprising a vertical surface, the vertical surface comprising a light transmission area, wherein the light transmission area is smaller than the vertical surface and is aligned with the waveguide, and
        a second portion extending along the first surface of the substrate, wherein the second portion of the optical device comprises at least two protrusions orthogonal to each other, and the substrate defines at least two grooves extending from the first surface of the substrate, and wherein the at least two protrusions of the second portion of the optical device engage with the at least two grooves of the substrate.

2. The semiconductor device package of claim 1, wherein the first portion of the optical device has a first width and the second portion of the optical device has a second width, wherein the second width is greater than the first width.

3. The semiconductor device package of claim 1, wherein the substrate comprises a semiconductor layer and a semiconductor oxide layer, and the waveguide is disposed in the semiconductor oxide layer.

4. The semiconductor device package of claim 3, wherein the optical device further comprises a light emitting or a light receiving portion aligned with the waveguide, and a vertical offset between the light emitting or the light receiving portion and the waveguide is less than about one third of a width of the waveguide.

5. The semiconductor device package of claim 1, wherein the first portion of the optical device is disposed in the substrate.

6. The semiconductor device package of claim 1, wherein the second portion of the optical device is disposed external to the substrate.

7. A semiconductor device package, comprising:
    a substrate having a first surface, the substrate defining a space having a bottom surface;
    a waveguide in the substrate; and
    an optical device disposed in the space and separated from the bottom surface of the space by a distance, the optical device comprising:
        an alignment portion extending along the first surface of the substrate and supported by the first surface of the substrate, and
        an optical portion comprising a vertical surface, the vertical surface comprising a light transmission area, wherein the light transmission area is smaller than the vertical surface and is aligned with the waveguide, wherein the alignment portion of the optical device comprises at least two protrusions orthogonal to each other, and the substrate defines at least two grooves extending from the first surface of the substrate, and wherein the at least two protrusions of the alignment portion of the optical device engage with the at least two grooves of the substrate.

8. The semiconductor device package of claim 7, wherein the light emitting or the light receiving portion is aligned with the waveguide within the substrate and below the first surface of the substrate.

9. The semiconductor device package of claim 7, wherein the alignment portion of the optical device is disposed directly on the first surface of the substrate.

10. The semiconductor device package of claim 7, wherein the light emitting or the light receiving portion of the optical device has a first width and the alignment portion of the optical device has a second width, wherein the second width is greater than the first width.

11. The semiconductor device package of claim 7, wherein an offset between the light emitting or the light receiving portion and the waveguide is less than about one third of a width of the waveguide.

12. A semiconductor device package, comprising:
a substrate comprising a first surface;
a waveguide disposed in the substrate; and
an optical device comprising;
   a first portion extending into the substrate without protruding from the first surface of the substrate, the first portion comprising a vertical surface, the vertical surface comprising a light transmission area, wherein the light transmission area is smaller than the vertical surface and is aligned with the waveguide, and
   a second portion extending along the first surface of the substrate;
wherein the second portion of the optical device is directly disposed on the first surface of the substrate, the second portion of the optical device comprises at least two protrusions orthogonal to each other, the substrate defines at least two grooves, and each protrusion of the second portion fits into a respective groove in the substrate.

13. The semiconductor device package of claim 12, wherein the first portion of the optical device has a first width and the second portion of the optical device has a second width, wherein the first width is less than the second width.

14. The semiconductor device package of claim 12, wherein the substrate comprises a semiconductor layer and a semiconductor oxide layer, and the waveguide is disposed in the semiconductor oxide layer.

15. The semiconductor device package of claim 12, wherein the substrate defines a space and the first portion of the optical device extends into the space, the semiconductor device package further comprising an adhesive gel in the space and surrounding a periphery of the first portion of the optical device.

16. The semiconductor device package of claim 15, wherein the space defined by the substrate has a bottom surface, and the first portion of the optical device does not contact the bottom surface.

17. The semiconductor device package of claim 7, further comprising an adhesive gel disposed in the space of the substrate and surrounding a periphery of the light emitting or the light receiving portion of the optical device.

18. The semiconductor device package of claim 17, wherein the adhesive gel fills the space of the substrate to a bottom of the waveguide.

19. The semiconductor device package of claim 17, wherein the adhesive gel is not in direct contact with the waveguide.

* * * * *